(12) United States Patent
Porte et al.

(10) Patent No.: US 7,757,719 B2
(45) Date of Patent: Jul. 20, 2010

(54) AIRCRAFT CONDUIT

(75) Inventors: Alain Porte, Colomiers (FR); Marie Jazet, Bessieres (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 12/376,139

(22) PCT Filed: Jul. 3, 2007

(86) PCT No.: PCT/FR2007/051747

§ 371 (c)(1),
(2), (4) Date: Feb. 3, 2009

(87) PCT Pub. No.: WO2008/015361

PCT Pub. Date: Feb. 7, 2008

(65) Prior Publication Data

US 2009/0197031 A1 Aug. 6, 2009

(30) Foreign Application Priority Data

Aug. 4, 2006 (FR) .................................. 06 53290

(51) Int. Cl.
*F16L 11/00* (2006.01)
(52) U.S. Cl. ................. 138/114; 138/125; 138/123; 138/DIG. 7; 428/36.91
(58) Field of Classification Search ................. 138/114, 138/148, DIG. 7, 123, 125, 145, 146; 428/36.91
See application file for complete search history.

(56) References Cited

U.S. PATENT DOCUMENTS

| 4,025,675 | A | * | 5/1977 | Jonda | ................. 428/36.2 |
| 5,244,726 | A | * | 9/1993 | Laney et al. | ............. 428/312.6 |
| 2004/0025465 | A1 | * | 2/2004 | Aldea et al. | .................. 52/514 |
| 2004/0176004 | A1 | * | 9/2004 | Fyfe | .......................... 442/138 |
| 2007/0066165 | A1 | * | 3/2007 | Fyfe | .......................... 442/59 |

FOREIGN PATENT DOCUMENTS

| EP | 1666784 | | 6/2006 |
| WO | WO 03087008 A2 | * | 10/2003 |
| WO | 2004016705 | | 12/2004 |

OTHER PUBLICATIONS

Davidovits, J. "30 Years of Successes and Failures in Geopolymer Applications, Market Trends and Potential Breakthroughs" Geopolymer Conference, Oct. 29, 2002, pp. 1-16 (cited in the search report of the corresponding PCT application).
International Search Report dated Dec. 17, 2007, in PCT application.

* cited by examiner

*Primary Examiner*—Patrick F Brinson
(74) *Attorney, Agent, or Firm*—Young & Thompson

(57) ABSTRACT

A pipe that is to be integrated into the aircraft piping, is characterized in that it is produced from a composite material that includes a fiber-reinforced geopolymer resin matrix.

10 Claims, 1 Drawing Sheet

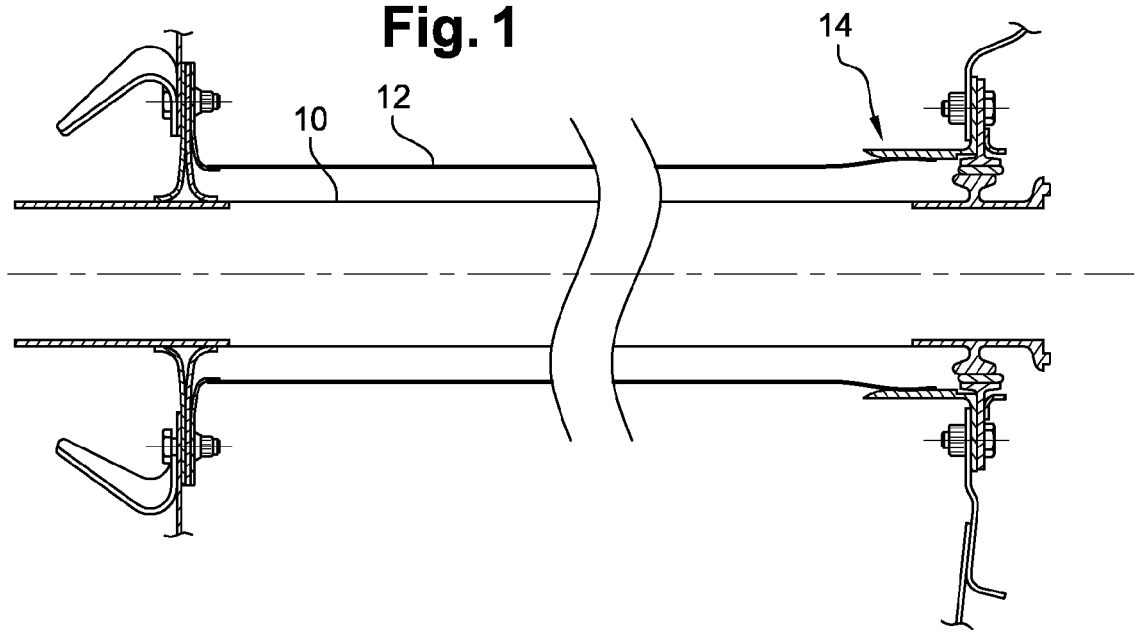
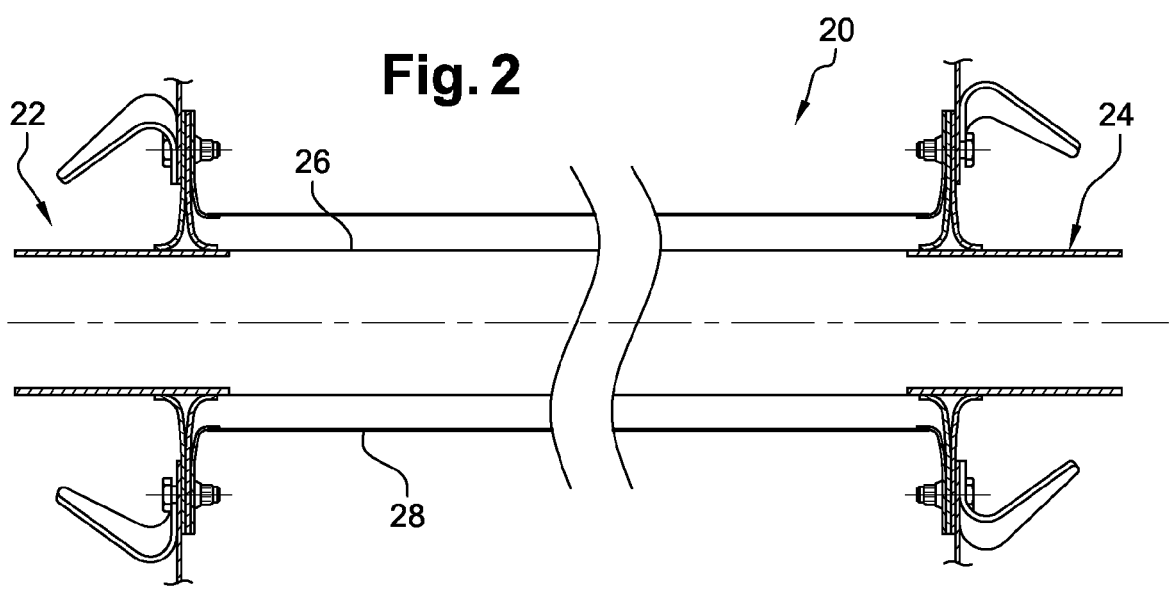

AIRCRAFT CONDUIT

This invention relates to an aircraft pipe, whereby said pipe is more particularly suitable for being placed in a zone that can be subjected to high temperatures, such as, for example, the power plant of the aircraft.

The power plant of an aircraft comprises numerous pipes for directing different fluids, whereby below said aircraft pipes are generically referred to as piping.

Taking into account the importance of the part of fuel in costs of use of an aircraft, the manufacturers tend to reduce the weight of aircraft so as to reduce their consumption, in particular by using composite materials to produce parts of the piping.

These composite materials consist of fibers, in particular carbon, graphite, basalt, aramid or glass, for example, woven in a matrix made of organic resin such as, for example, an epoxy, thermoplastic or thermosetting resin. The fibers can come in the form of fabric or non-woven sheets of fabric, as appropriate.

To be able to be used subsequently, these fibers are generally coated. Actually, during their production, the surface condition of these fibers is degraded, which impairs the adhesion of the organic resins. In addition, the manipulation of fibers in the raw state, during a weaving operation, for example, is tricky because fibrils become detached from the main bundle. Also, the dry fibers are treated to restore the surface condition then coated by an organic resin that promotes chemical adhesion for subsequent impregnation. This coating is referred to as finish. The finished commercialized fibers are smooth and ready for use.

Industrial techniques have been developed for the implementation of the finished fibers and epoxy resins. These techniques are controlled and make it possible to obtain production costs of parts that are compatible with those of the equivalent metal parts.

Furthermore, the composite-material parts offer mechanical characteristics that are at least equal to those of the metal parts and are clearly lighter than the latter.

However, the use of the composite materials for producing parts of the piping may prove problematic in some cases, in particular when said parts are placed in zones that can be subjected to high temperatures, for example of more than 500° C. It is in particular the case of the piping provided in the environment of the engine. However, at such temperatures, the pipes that are made of composite material based on organic resin lose their mechanical characteristics and become porous, which is reflected by a lack of reliability of said pipes.

The architecture of the engine generally takes into account this lack of reliability at high temperature of the composite-material pipes by incorporating firebreak baffles, for example, for limiting the propagation of heat toward the pipes. Nevertheless, this solution is not satisfactory because it complicates the engine, and the increase in weight associated with the use of a composite-material pipe is reduced almost to zero by the presence of additional baffles.

For safety reasons, the pipes are doubled, namely a main pipe 10 that is also called an internal pipe is placed inside a second pipe 12 that is called an external pipe, as illustrated in FIG. 1. Thus, even in the case of a leak from the internal pipe, the fluid that circulates in the second pipe continues to supply the element for which it is intended.

When composite materials are used to produce the internal pipe 10, the latter is placed in an external titanium pipe 12 to protect it, in particular from high temperatures.

However, this solution is not satisfactory for the following reasons: The use of titanium for the external pipe produces excess weight and additional expense for the piping.

Furthermore, the combination of different materials for the internal and external pipes that necessarily have different mechanical and structural characteristics produce numerous problems during the design. Thus, it is necessary to provide systems 14 for taking up relative movements (translation and rotation) between the pipes and systems for complex connection or attachment to take into account expansion differences between the two pipes. All of these elements complicate the piping, and lead to making maintenance more complicated and longer and to increasing the unit's weight.

Also, this invention aims at remedying the drawbacks of the prior art by proposing a pipe for an aircraft that can retain its reliability at high temperatures.

For this purpose, the invention has as its object a pipe that is integrated into the aircraft piping that is characterized in that it is produced from a composite material that comprises a matrix that is made of fiber-reinforced geopolymer resin.

Other characteristics and advantages will emerge from the following description of the invention, a description that is provided only by way of example, taking into account the accompanying drawings, in which:

FIG. 1 is a longitudinal cutaway of a piping part according to the prior art that comprises an internal pipe made of composite material based on organic resin and an external pipe made of titanium, and FIG. 2 is a longitudinal cutaway of a piping part according to the invention that comprises an internal pipe and an external pipe made of composite material based on geopolymer resin.

In FIG. 2, a part of the piping installed on an aircraft was shown at 20. This invention is described as applied to the piping of a power plant of an aircraft, because this type of piping is the most greatly stressed, in particular by temperature. Thus, in the case of fire, the piping can be subjected to a temperature of more than 500° C.

However, the invention is not limited to this application and could be applied to other piping systems of an aircraft.

This piping part 20 ensures the transfer of a fluid between a first end 22 and a second end 24. Each end 22, 24 comprises means for being connected to another element, for example another part of the piping, a device to supply fluid or able to provide a fluid.

This piping part comprises at least one pipe 26 that ensures the transfer of the fluid.

According to the invention, the pipe 26 is made of a composite material that comprises a fiber-reinforced geopolymer resin.

To obtain a material that is able to retain its mechanical strength at high temperature, a sialate-type geopolymer resin $(xSiO_2, AlO_2)$, in which x is between or equal to 1.75 and 50, is used. Advantageously, the commercialized resin is used under the name MEYEB by the Cordi-Geopolymer Company.

Geopolymer resin is defined as a geopolymer resin or a mixture of geopolymer resins.

According to the applications, the fibers can have different sections and be produced from different materials, such as, for example, carbon, graphite, basalt, aramid or glass.

The fibers can be in the form of a woven material, a non-woven material, or a sheet of fabric.

In the natural state, carbon comes in thread form comprising burrs which impart a very abrasive nature to the material. To make possible a subsequent shaping, these fibers are generally coated. Actually, during their development, the surface condition of these fibers is degraded, which impairs the adhesion of the organic resins. In addition, the handling of the fibers in the raw state, during a weaving operation, for example, is difficult because fibrils become detached from the main bundle. Also, the dry fibers are treated to restore the surface condition then coated by an organic resin that promotes chemical adhesion for a subsequent impregnation. This coating is referred to as finish. The finished commercialized fibers are smooth and ready for use.

The amount of finish is relatively small relative to the fiber and represents only on the order of 1% by mass of the finished fiber. Furthermore, the nature of the organic resin that is used for the finish can vary from one manufacturer to the next.

To promote the adhesion of the geopolymer resin matrix to the fibers, it is necessary to remove the finish at least partially, whereby the organic resins and the geopolymer resins are immiscible.

The removal of the finish by a heat or chemical treatment makes possible the use of greatly commercialized fabrics.

According to one embodiment, the removal of the finish is carried out using a heat treatment that consists in heating the fibers up to the heat degradation temperature of the resin so that the latter no longer adheres to the fibers. Advantageously, the heat treatment is carried out under inert atmosphere.

This treatment makes it possible to treat the majority of the commercialized fibers, with a possible adjustment of the temperature and/or the temperature cycle to which the finished fibers are subjected. It makes possible a relatively fast treatment on the order of several minutes.

Whereby the heat degradation temperatures of the resins that are used for the finish are very close to the oxidation temperature of the carbon fibers, it is advisable to determine the temperature and/or the temperature cycle to which the fibers are subjected. Actually, too high a level of degradation of the fibers would lead to greatly reducing the characteristics of the product that is obtained.

In general, the end of the removal period of the finish corresponds to the beginning of the degradation period of the fibers.

A good compromise for obtaining a satisfactory adhesion and a limited degradation of fibers consists in removing between 50% and 90% of the finish.

To determine the heating temperature, a test is carried out on a sample. Using a thermogravimetric analysis (TGA) that may or may not be associated with a mass spectrography, it is possible to identify the compound that is used for the finish and to determine the beginning and end removal temperatures as well as the subtracted mass.

The heat treatment then consists in heating the product under inert atmosphere by taking care to keep the mean temperature of the furnace in the range determined during the thermogravimetric analysis. Final monitoring of the mass loss makes it possible to validate the process.

According to another operating mode, the removal of the finish can be done using a chemical treatment, in particular by using a solvent.

First of all, it is necessary to identify the compound that is used for the finish so as to select the solvent. This identification can be conducted by a thermogravimetric analysis. The chemical method is relatively simple to use and requires at least one solvent bath, such as methylene chloride, for example. The treatment period is determined based on, in particular, the compound that is used for the finish.

To reduce the treatment period, a good compromise for obtaining a satisfactory adhesion and a limited treatment period consists in removing between 50% and 90% of the finish.

According to another characteristic of the invention, to improve the impregnation of the fibers, an addition of water in the resin, on the order of 3 to 7% by volume to improve the fluidity of said resin and to obtain a homogenization of the migration of said resin in the fibers, is carried out. This addition of water is more than the amount of water recommended by the resin manufacturer.

The pipe 26 that is made from a geopolymer resin-based composite material withstands high temperatures and retains its structural and mechanical characteristics as well as its porosity. Contrary to previous pipes whose porosity increases at high temperatures, the pipe according to the invention retains a porosity that allows it to be airtight.

According to the variants, the pipe 26 may or may not have a circular section and may comprise rectilinear and/or curved portions.

According to an embodiment, the part of the piping comprises two pipes, a first pipe 26 referred to as an internal pipe arranged in a second pipe 28 referred to as an external pipe, whereby the two pipes are made of a geopolymer resin-based composite material and are preferably approximately coaxial. This configuration makes it possible to obtain more reliable piping to the extent that if the internal pipe leaks, the fluid is always transferred via the second pipe 28.

The fact of providing two pipes made of the same material makes it possible to simplify the piping to the extent where it is no longer necessary to provide devices that make it possible to compensate for the relative movements that can appear when the pipes are produced in materials that have different expansion coefficients. Furthermore, the fact of producing the two pipes from carbon fibers woven in a geopolymer resin matrix makes it possible to limit the dimensional variations of the elements, whereby the carbon does not expand although the connection means that are provided at the ends are simplified.

The invention claimed is:

1. A pipe integrated into aircraft piping, the pipe produced from a composite material comprising a fiber-reinforced geopolymer resin matrix, the composite material comprising woven fibers impregnated with a sialate-type geopolymer resin ($xSiO_2$, $AlO_2$), in which x is between or equal to 1.75 and 50, wherein a finish has been at least partially removed from the fibers prior to impregnation with the geopolymer resin.

2. The pipe according to claim 1, wherein the pipe comprises two pipes, a first internal pipe (26) into which a fluid can flow, whereby said internal pipe (26) is placed inside a second external pipe (28).

3. A method of manufacturing a pipe to be integrated into aircraft piping, the pipe being produced from a composite material comprising a fiber-reinforced geopolymer resin matrix, the composite material comprising woven fibers impregnated with a sialate-type geopolymer resin ($xSiO_2$, $AlO_2$), in which x is between or equal to 1.75 and 50, said method comprising a step of at least partially removing a finish from the fibers prior to impregnation with the geopolymer resin.

4. The method of claim 3, wherein said removing step removes between 50% and 90% of the finish.

5. The method of claim 3, comprising the further step of improving fluidity of said resin and obtaining a homogenization of a migration of the resin in the fibers by adding water in the resin in an amount from 3% to 7% by volume, wherein impregnation of the fibers is improved.

6. A pipe integrated into an aircraft piping, the pipe obtained by the method according to claim 3.

7. Aircraft piping that comprises at least one pipe according to claim 6.

8. Aircraft piping according to claim 7, comprising:
two pipes, a first internal pipe (26) into which a fluid can flow, and a second external pipe (28),
wherein said internal pipe (26) is located inside the external pipe (28).

9. A pipe according to claim 1, wherein the pipe is comprised of a first internal pipe (26) into which a fluid can flow, and a second external pipe (28), said internal pipe (26) located inside the external pipe (28),
said internal pipe and said external pipe being made of the same resin matrix.

10. Aircraft piping, comprising:
a first internal pipe (26) into which a fluid can flow between a first end and a second end;
a second external pipe (28), said internal pipe (26) located inside the external pipe (28); and
connection elements located at each of the first end and second end, the connection elements providing for connection to further aircraft fluid elements,
the internal pipe and the external pipe being made of the same composite material that comprises a fiber-reinforced geopolymer resin of a sialate-type geopolymer resin ($xSiO_2, AlO_2$), in which x is between or equal to 1.75 and 50 wherein a finish has been at least partially removed from the fibers prior to impregnation with the geopolymer resin.

* * * * *